(12) United States Patent
Boyer

(10) Patent No.: US 6,494,437 B1
(45) Date of Patent: *Dec. 17, 2002

(54) BOOM MOUNTED WINCH

(76) Inventor: Mark L. Boyer, 9316 Reid Lake, Houston, TX (US) 77064

( * ) Notice: Subject to any disclaimer, the term of this patent is extended or adjusted under 35 U.S.C. 154(b) by 151 days.

This patent is subject to a terminal disclaimer.

(21) Appl. No.: 09/635,745

(22) Filed: Aug. 10, 2000

Related U.S. Application Data

(60) Continuation-in-part of application No. 09/025,322, filed on Feb. 18, 1998, now Pat. No. 6,152,425, which is a continuation-in-part of application No. 08/780,318, filed on Jan. 8, 1997, which is a division of application No. 08/547,472, filed on Oct. 24, 1995, now Pat. No. 5,626,442.

(51) Int. Cl.$^7$ .................................................. B66D 1/00
(52) U.S. Cl. ........................ 254/323; 254/329; 254/380; 212/232; 212/252; 212/347
(58) Field of Search .................................. 254/323, 326, 254/327, 328, 329, 380; 212/252, 251, 223, 232, 255, 347

(56) References Cited

U.S. PATENT DOCUMENTS

| | | | |
|---|---|---|---|
| 231,015 A | 8/1880 | Dark | |
| 317,158 A | 5/1885 | Lowrie | |
| 778,903 A | 1/1905 | Schussler | |
| 2,297,164 A | 9/1942 | Rainwater | |
| 2,382,054 A | 8/1945 | Hercik | |
| 2,564,929 A | 8/1951 | Shoemaker | |
| 2,682,677 A | 7/1954 | Marshall | |
| 2,735,122 A | 2/1956 | Pletcher | |
| 2,846,100 A | 8/1958 | Ciaccio | |
| 3,058,137 A | 10/1962 | Doyle et al. | |
| 3,181,192 A | 5/1965 | Truman | |
| 3,218,033 A | 11/1965 | Miller | |
| 3,233,315 A | 2/1966 | Levake | |
| 3,543,377 A | 12/1970 | Bremner | |
| 3,562,836 A | 2/1971 | Frew et al. | |
| 3,574,356 A | 4/1971 | Salerno et al. | |
| 3,582,126 A | 6/1971 | Bladholm | |
| 3,645,102 A | 2/1972 | Chlumecky | |
| 3,661,358 A | 5/1972 | Dill | |
| 3,788,605 A | 1/1974 | Johnson | |
| 3,829,064 A | 8/1974 | Jackson | |
| 3,874,532 A | 4/1975 | Metailler | |
| 3,900,185 A | 8/1975 | Burr | |
| 3,907,253 A | 9/1975 | Schosek | |
| 4,102,528 A | 7/1978 | Cripe | |
| 4,218,045 A | 8/1980 | Weismann | |
| 4,293,269 A | 10/1981 | Zook | |
| 4,309,128 A | 1/1982 | Williams | |
| 4,326,893 A | 4/1982 | Clifford | |
| 4,337,096 A | 6/1982 | Clifford | |
| 4,356,039 A | 10/1982 | Clifford | |
| 4,417,628 A | 11/1983 | Gessner | |
| 4,487,052 A | 12/1984 | Yarnell | |
| 4,507,019 A | 3/1985 | Thompson | |
| 4,518,152 A | 5/1985 | Pierce et al. | |
| 4,523,684 A | 6/1985 | Baisden | |
| 4,626,134 A | 12/1986 | Coumont | |
| 4,637,756 A | 1/1987 | Boles | |

(List continued on next page.)

FOREIGN PATENT DOCUMENTS

AU 293488 6/1969

*Primary Examiner*—Emmanuel Marcelo
(74) *Attorney, Agent, or Firm*—Jenkens & Gilchrist A Professional Corporation

(57) ABSTRACT

A winch spooled with a cable is provided for mounting on the boom of a host vehicle. The winch is surrounded by a frame housing that is capable of withstanding the forces applied by the host vehicle. A braking mechanism is provided for controlling the spooling and unspooling of the cable. The winch is mounted on the boom of a host vehicle by a conventional attachment that is used for other custom tools such as buckets of a backhoe.

14 Claims, 13 Drawing Sheets

U.S. PATENT DOCUMENTS

| | | |
|---|---|---|
| 4,650,163 A | 3/1987 | Peterson |
| 4,659,276 A | 4/1987 | Billett |
| 4,712,946 A | 12/1987 | Greatorex et al. |
| 4,728,223 A | 3/1988 | Rice |
| 4,732,222 A | 3/1988 | Schmidt |
| 4,818,314 A | 4/1989 | Brittain et al. |
| 4,830,539 A | 5/1989 | Akesaka |
| 4,874,268 A | 10/1989 | Akesaka |
| 4,881,864 A | 11/1989 | Amato |
| 4,925,344 A | 5/1990 | Peres et al. |
| 4,954,016 A | 9/1990 | Storgard |
| 5,013,188 A | 5/1991 | Campbell et al. |
| 5,056,269 A | 10/1991 | Westman |
| 5,069,722 A | 12/1991 | Murphy |
| 5,129,761 A | 7/1992 | Andersen et al. |
| 5,139,751 A | 8/1992 | Mansfield et al. |
| 5,205,544 A | 4/1993 | Kroeger |
| 5,211,509 A | 5/1993 | Roessler |
| 5,213,727 A | 5/1993 | Gargiulo |
| 5,244,505 A | 9/1993 | Allison et al. |
| 5,249,378 A | 10/1993 | Frame |
| 5,253,956 A | 10/1993 | Fisco et al. |
| 5,302,053 A | 4/1994 | Moriarty |
| 5,372,162 A | 12/1994 | Frey |
| 5,387,071 A | 2/1995 | Pinkston |
| 5,444,887 A | 8/1995 | Rufolo |
| 5,522,582 A | 6/1996 | Dilks |
| 5,529,360 A | 6/1996 | Black |
| 5,626,442 A | 5/1997 | Boyer |
| 5,692,735 A | 12/1997 | Aho et al. |
| 5,794,920 A | 8/1998 | Kronberger |
| 5,820,108 A | 10/1998 | Ostrobrod |

US 6,494,437 B1

BOOM MOUNTED WINCH

This is a continuation-in-part application of a continuation-in-part application entitled "Boom Mounted Winch," Ser. No. 09/025,322 filed Feb. 18, 1998 now U.S. Pat. No. 6,152,425, which was a continuation-in-part application filed on Feb. 2, 1998, of application Ser. No. 08/780,318 entitled "A Pipe Rehabilitation Test Mandrel" filed Jan. 8, 1997, which was one of several divisional applications of a prior application Ser. No. 08/547,472 filed on Oct. 24, 1995, by Mark L. Boyer for "Pipe Rehabilitation System and Methods," now U.S. Pat. No. 5,626,442 issued May 6, 1997.

FIELD OF THE INVENTION

The invention relates to a winch that is mounted onto a boom of a host vehicle at the custom tool attachment point.

BACKGROUND OF THE INVENTION

Construction and transportation activities can require boom mounted winch capability for a number of reasons. In some cases, a winch is needed in a confined area which is accessible by a crane mounted winch. In other instances, the mobility of a mobile vehicle equipped with a boom and winch for moving and lifting is desirable.

One application for a boom mounted winch is in connection with utility infrastructure replacement and rehabilitation. The buried utility pipes present access problems. A premium is placed on using manholes and other existing access areas. If excavation can be avoided, a significant savings in both cost and time can be realized. Equipment that provides both mobility and flexibility for rehabilitation can be of significant practical benefit.

A winch that is mounted on a boom of a vehicle has the ability to make use of existing access areas. The host vehicle must provide a stable platform for extension of the boom and use of the winch. In such an apparatus, the boom is positioned so that the winch can pull equipment such as a cleaning bucket or a slip lining segment through the host pipe.

The inherent mobility of the host vehicle allows a great deal of flexibility. It can rapidly move from location to location with minimal set-up and take-down time. A further benefit of a boom mounted winch includes a variety of surface applications. The winch on the host vehicle can accomplish any task that is required of a regular winch such as pulling or lifting loads on the surface. As with the underground applications, the mobility of the host vehicle offers the flexibility of moving from location to location with great ease while providing a stable platform to operate the winch.

SUMMARY OF THE INVENTION

A boom mounted winch spooled with cable has been developed for use in both down hole and surface applications. The winch is surrounded by a housing that allows for free movement of the cable as it is spooled and unspooled from the winch. The housing is provided with an attachment means for engagement with the boom of the host vehicle. In one embodiment, the housing is a frame that surrounds the winch. Further, the frame can be constructed to withstand substantial weight, including the force of the weight of the host vehicle and the boom. The attachment means on the housing for engagement with the boom can be constructed similarly to attachment points for other custom tools used with host vehicles.

The host vehicle is a construction vehicle such as an excavator, backhoe or loader mounted with the boom. The winch can be placed on the end of a boom at the custom tool attachment point typically used to mount a bucket of a backhoe of the host vehicle. The mechanism for spooling and unspooling the cable on the winch can utilize a hydraulic system and, more particularly, the hydraulic system that is provided on the host vehicle. The winch may also include a brake mechanism to control the spooling and unspooling of the cable.

In another embodiment, the boom mounted winch housing is attached to a down hole boom with guide means on the down hole boom to position the cable. The down hole boom is a set of C-beams of adjustable length which uses an adjustable guide roller as a guide means.

In further embodiments, the boom mounted winch includes a winch drum spooled with the cable, and the housing is a rectangular frame housing that surrounds the winch and allows free movement of the cable. The attachment means to the boom includes at least two extensions from the frame provided with connection points used for custom tool connections to the booms of mobile vehicles. A power means is provided on the winch as well as a brake means for controlling the spooling and unspooling of the cable on the winch. The frame housing can withstand the weight of the mobile vehicle and the boom. A friction pad selectively contacts the winch drum for braking and controlling the spooling and unspooling of the cable.

DESCRIPTION OF THE PREFERRED EMBODIMENTS

The following is a description of the invention and figures. In different figures, the same elements are represented with the same numbers.

Figure 1:
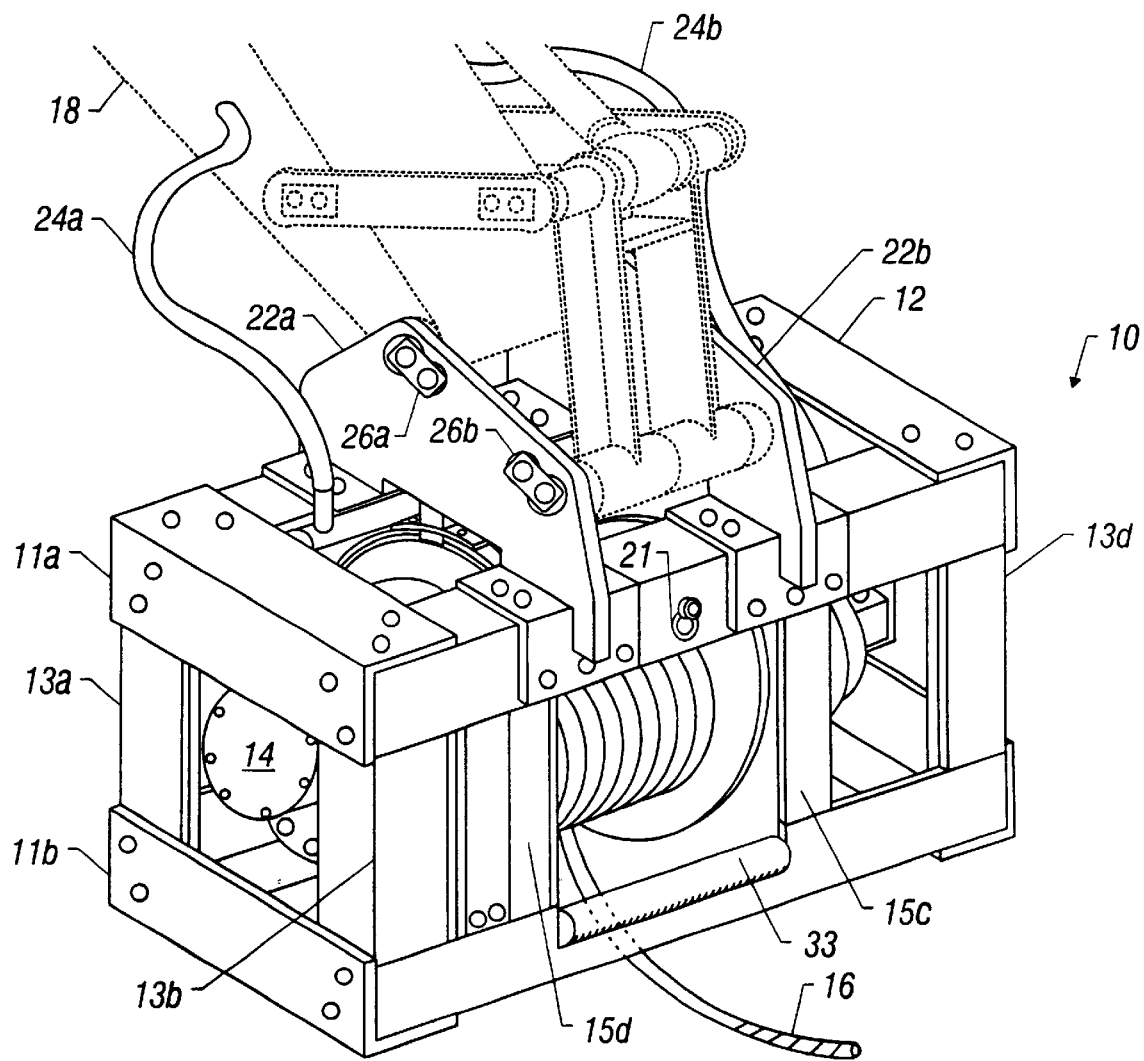
FIG. 1 is a perspective view of the winch and housing mounted on the boom.

FIG. 1 shows a detailed perspective view of the boom mounted winch 10. The winch 10 includes a winch drum 14 which is spooled with a cable 16. The winch drum 14 is surrounded by a unitary housing 12. The housing shown in FIG. 1 has an open frame to allow for free movement of the cable 16 through the housing 12. The cable 16 on the rotating drum 14 of the winch can pass through the openings on any side of the housing 12. This allows the line to pull a load from any direction. Rollers 33 can be used to prevent damage to the winch cable if it rubs the frame. At least one side of the frame housing 12 rests relatively flat, as shown in FIG. 1. While a box-like frame housing 12 is shown in FIG. 1, a more rounded open frame can be used in an alternative embodiment. In one embodiment, the frame housing 12 is built of strong metal such as heavy steel that can bear the forces applied by the host vehicle. Frame housing 12 has a supplemental attachment point 21 which can be used for a chain attachment as shown in FIG. 2.

The host vehicle can provide the power system for spooling and unspooling the cable. In one embodiment, the power system is a hydraulic system as shown with the hydraulic connections 24a and 24b. Other methods such as a mechanical system may be used. The frame housing 12 is constructed with attachment plates 22a and 22b. These attachment plates 22a and 22b are provided with attachment points 26a and 26b for mounting the winch on a boom.

Figure 2:
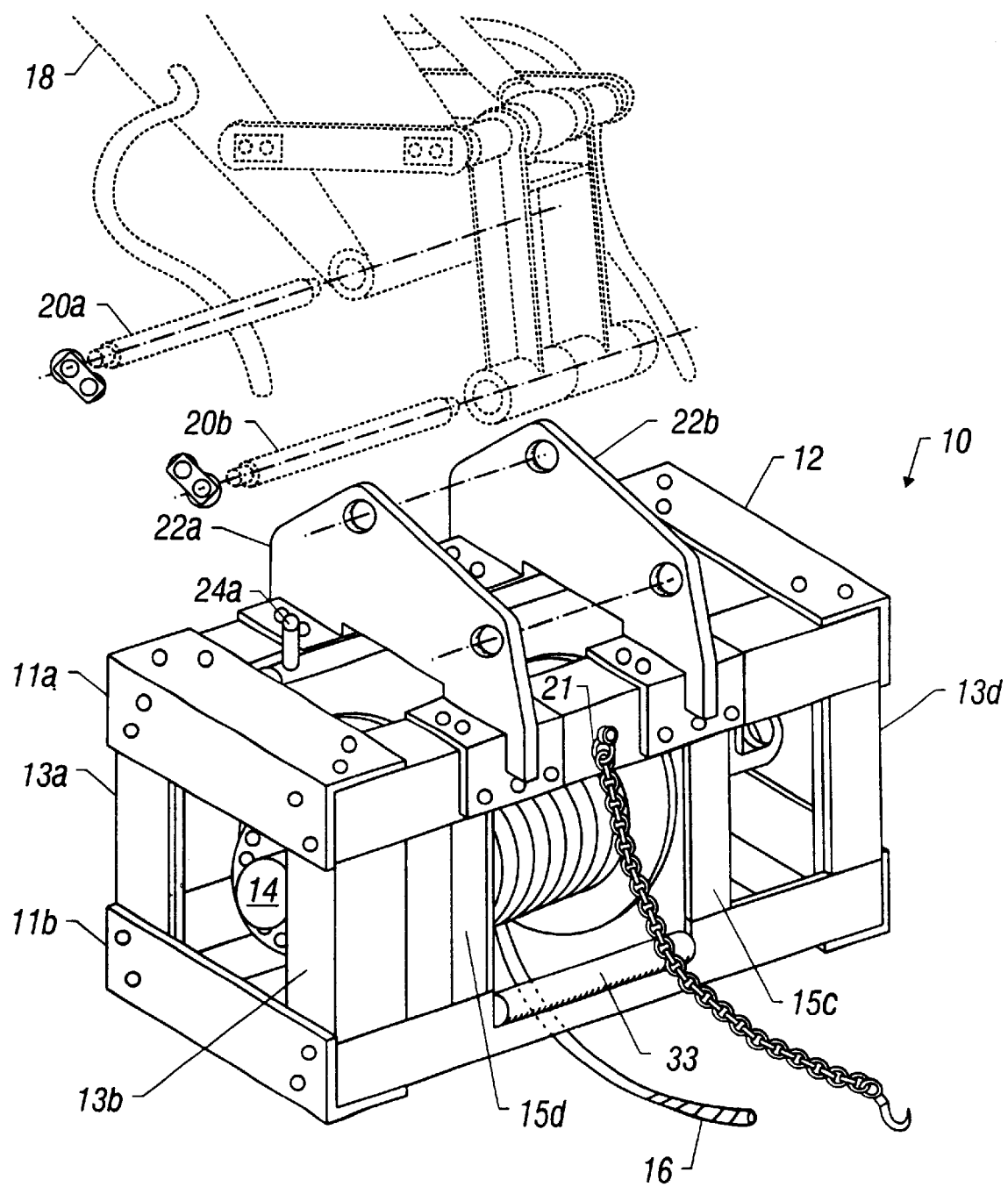
FIG. 2 is a perspective view of the winch and housing dismounted from the boom.

As shown in FIG. 2, the apparatus is mounted on the boom 18 with attachment pins 20a and 20b. The attachment points 26a and 26b are spaced to correspond to custom tool attachments so that in the preferred embodiment the winch 10 can be used on a host vehicle in the same method as other custom attachments. The host vehicle itself can be a vehicle such as an excavator, backhoe or loader. However, the host vehicle is not limited to these types.

Figure 3:
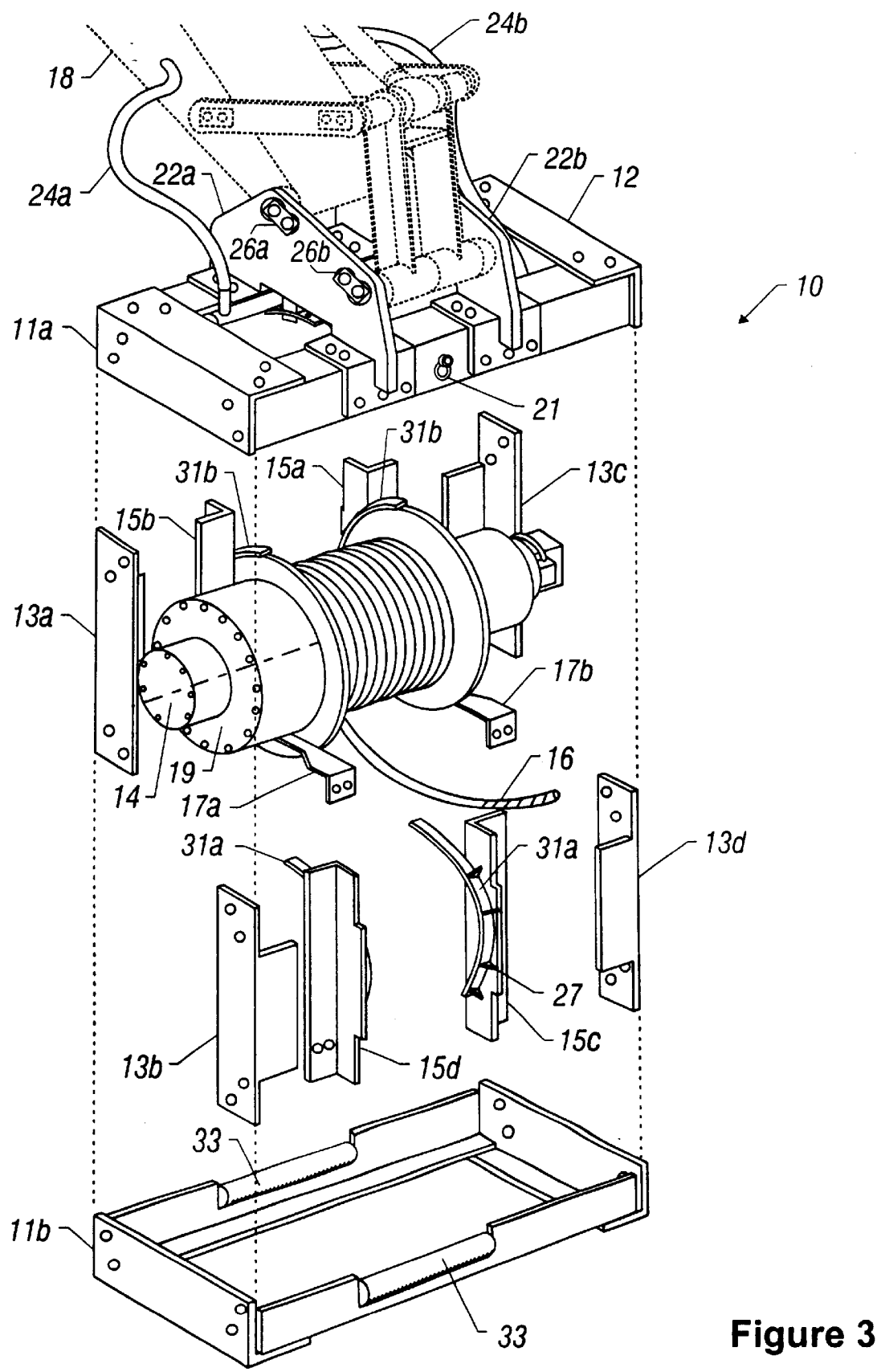
FIG. 3 is an exploded view of the winch and housing.

FIG. 3 shows a detailed, exploded view of the winch and its housing. The housing consists of a frame housing top 11a and a frame housing base 11b attached to each other on their corners by four frame housing supports 13a, 13b, 13c and 13d. The frame housing top 11a and frame housing base 11b are also connected by four interior frame supports 15a, 15b, 15c and 15d.

The frame housing top 11a and frame housing bottom 11b, as shown in the figures, are generally rectangular. Each side of the frame housing top 11a and frame housing 11b are made of a rigid member attached together to form the frame. The frame can be a solid, rigid member. The supports 13a–d and 15a–d are rigid members attached at either end to frame housing top 11a and frame housing bottom 11b to form a frame. The frame can be made of a different construction consistent with the functions described herein. In FIG. 3, only two of the interior frame supports 15c and 15d are shown in an exploded view. The other two interior frame supports 15a and 15b are shown in their proper position behind the winch drum 14. The winch drum 14 is held in place by two horizontally placed winch drum supports 17a and 17b which are rigid members connected to the interior frame supports 15a, 15b, 15c and 15d under the winch drum 14. Also shown is a winch gear housing 19 which covers a set of planetary gears (not shown) and a supplemental support attachment point 21 located on the frame housing top 11a. Also shown are front cable guards 31a and rear cable guards 31b which are semi-circular rigid members mounted in a concentric manner adjacent to the winch drum 14 on interior supports 15d and 15c. Both front cable guards 31a and rear cable guards 31b aid in preventing the cable from unspooling and becoming tangled outside the winch drum 14. The front cable guards 31a are shown in an exploded view while the rear cable guards 31b are shown in their proper position adjacent to the winch drum 14. The frame housing top 11a is shown as attached to boom 18 of the host vehicle as shown in FIG. 2.

Figure 4:
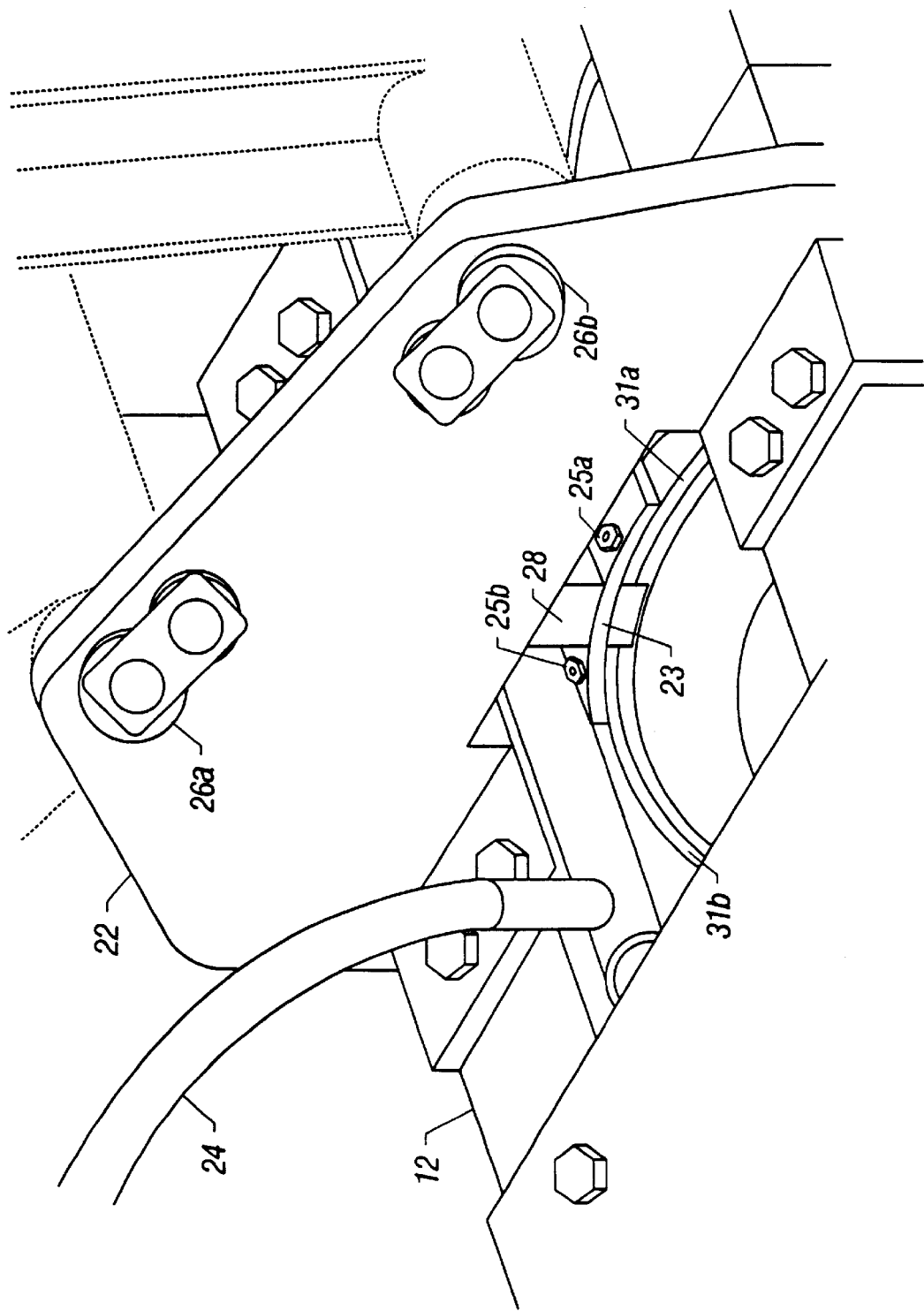
FIG. 4 is a perspective view of the brake mechanism.
Figure 5:
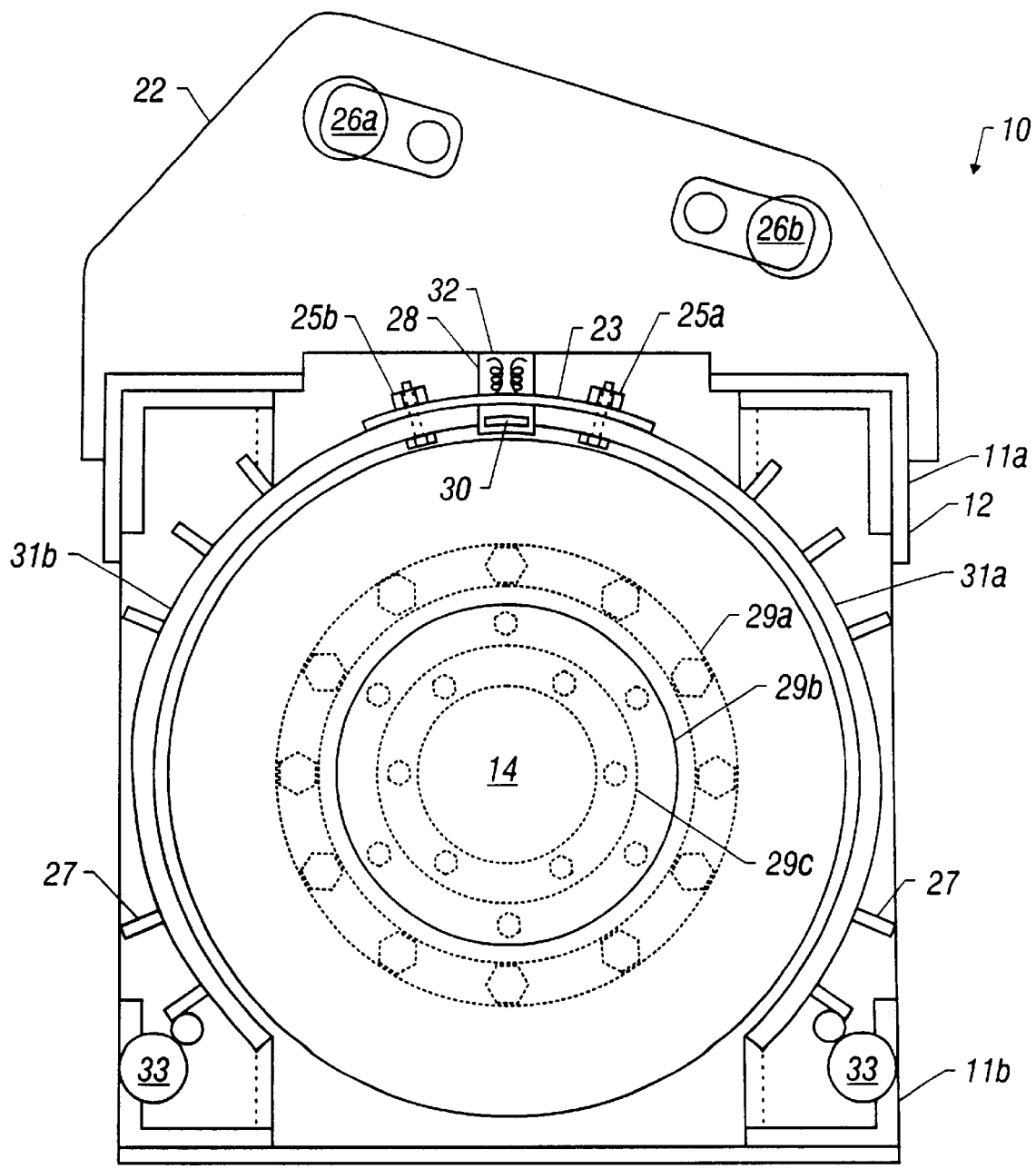
FIG. 5 is a side partial cross-section view of the winch, brake mechanism and housing.

As shown in FIGS. 4 and 5, a brake mechanism 28 is used to control the spooling and unspooling of the winch 10. As shown in FIG. 5, the brake mechanism 28 uses a friction pad 30 that contacts the winch drum 14 by using springs 32 to apply a compressive force to the friction pad. The brake mechanism is used to control backlash of the cable during spooling and unspooling operations. The friction pad holds the drum or prevents rotation when not in use. These pads prevent free movement of the drum which prevents backlash.

FIG. 5 shows a side partial cross-section view of the winch drum 14, the brake mechanism 28, and the frame housing 12. The springs 32 and the friction pad 30 are shown internal to the brake mechanism 28. In this embodiment, a single braking mechanism 28 is shown with two springs 32 and one friction pad 30. In alternative embodiments, at least one or more springs 32 and a plurality of friction pads 30 can be used in the braking mechanism 28. Furthermore, an additional braking mechanism 28 could be located on the other side of the winch drum 14.

Front cable guard 31a and a rear cable guard 31b are connected together by the cable guard bridge 23. The cable guard bridge 23 is a curved rigid member attached to each cable guard by cable guard fasteners 25a and 25b at the top of the winch drum 14 on either side of the brake mechanism 28. The cable guard fasteners are shown in this embodiment as a nut and bolt, but any suitable attachment means could be used. Both the front cable guard 31a and the rear cable guard 31b are shown with a plurality of cable guard prongs, two of which are indicated at numeral 27, which serve to keep the cable from unspooling off of the winch drum 14. An internal set of planetary gears 29a, 29b and 29c are shown by broken lines. However, the winch drum 14 may use other types of gearing mechanisms in alternative embodiments.

Figure 6:
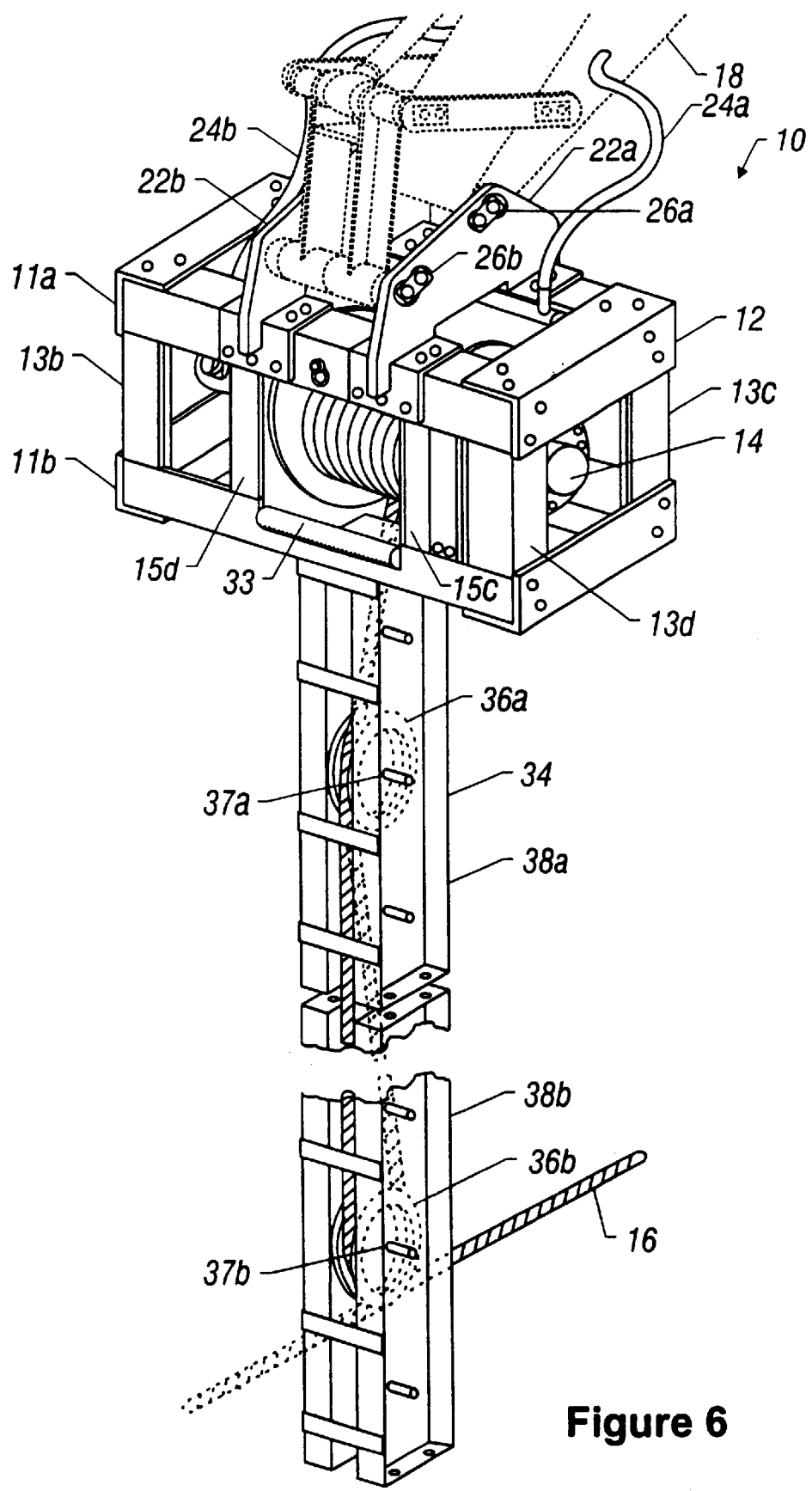
FIG. 6 is a perspective view of a winch and a down hole boom.

An alternative embodiment of the winch 10 includes a down hole boom. FIG. 6 is a detail of an embodiment with the down hole boom 34 shown attached to the frame housing 12. The down hole boom 34 is configured with back to back C shaped beams 38a and 38b spaced apart with guide rollers 36a and 36b positioned in between the C-beams. The guide rollers 36a and 36b are adjustable by using adjustment pins 37a and 37b inserted into openings along the down hole boom 34. The attachment pins 37a and 37b are held in place by such means as a clip, bolt and washer or other means known to those in the art. The down hole boom 34 has numerous attachment pins or points for holding attachments pins that are positioned in slots along the length of the down hole boom so that the guide rollers can be positioned as needed. As shown in FIG. 6, guide roller 37b can be positioned so that the cable 16 is positioned in the host pipe. To facilitate smooth driving of the cable, additional guide rollers can be included along the length of the down hole boom 34. As shown in FIG. 6, the cable can be fed on either side of guide roller 37b depending on which direction cable is driven into the host pipe.

Figure 7:
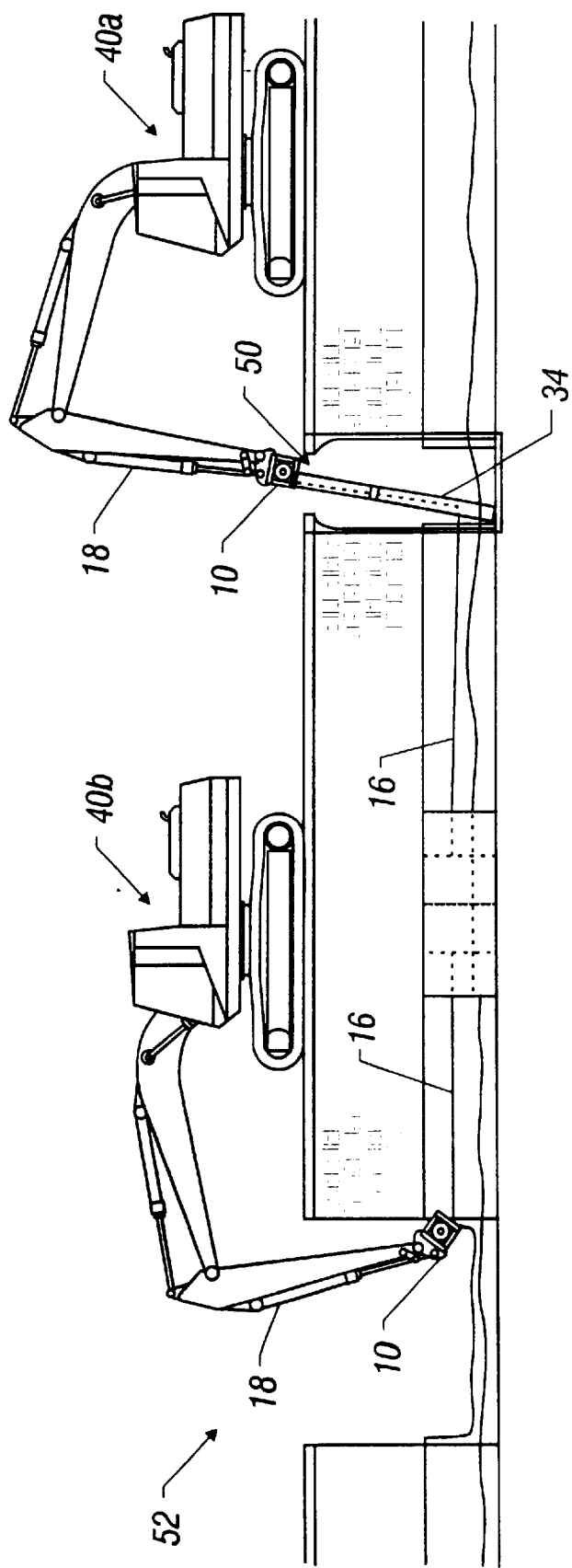
FIG. 7 is a perspective view of a pipe testing operation using both a winch and a winch with a down hole boom.

An example of an embodiment of both the winch mounted on a boom and the winch mounted on a boom with a down hole boom is shown in FIG. 7. FIG. 7 is a depiction of a testing operation of pulling a test mandrel to check for obstructions in the host pipe. The host pipe has been accessed at one end by an excavated access shaft 52 and on the other end by an existing manhole 50 or other existing access shaft which is wide enough to accommodate down hole boom 34.

At the excavated access shaft, the winch 10 is mounted on a boom 18. The host vehicle is a movable mount which is shown as conventional excavator 40b. The excavator 40b is equipped with a movable boom mechanism with a conventional point of attachment.

As shown, the winch 10 is located beneath the surface of the excavated access shaft 52 at the mouth of the host pipe. In other embodiments, both the down hole boom 34 and winch 10 may be supported at the surface above the excavated access shaft 52 by a stationary support. FIG. 7 shows the use of excavators 40a and 40b with a movable boom 18 to illustrate the transportability and flexibility of the system.

At the other end of the host pipe, the down hole boom 34 and winch 10 are also mounted on an excavator 40a. The down hole boom 34 extends from above the surface of the manhole entrance to a resting point on the boom of the manhole 50. In the preferred embodiment down hole boom 34 has a guide roller at the end of the down hole boom close to the mouth of the host pipe. The guide roller is adjustable along the length of the down hole boom 34 so that cable 16 from winch 10 can extend around guide roller and into the host pipe. The length of the down hole boom 34 may be adjusted by attaching additional segments together.

Figure 8:
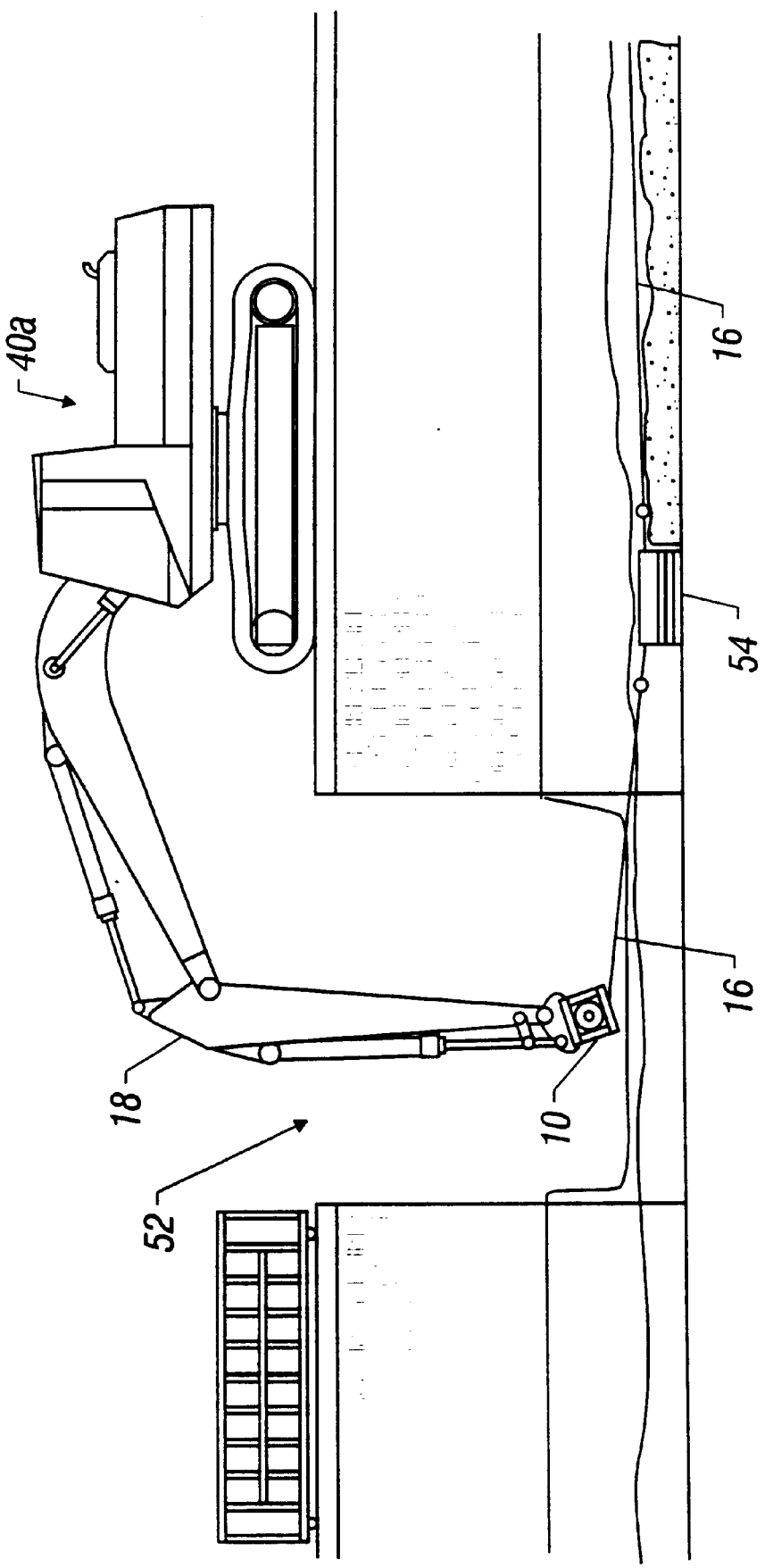
FIG. 8 is a perspective view of a pipe cleaning operation using a winch to pull the cleaning bucket.
Figure 9:
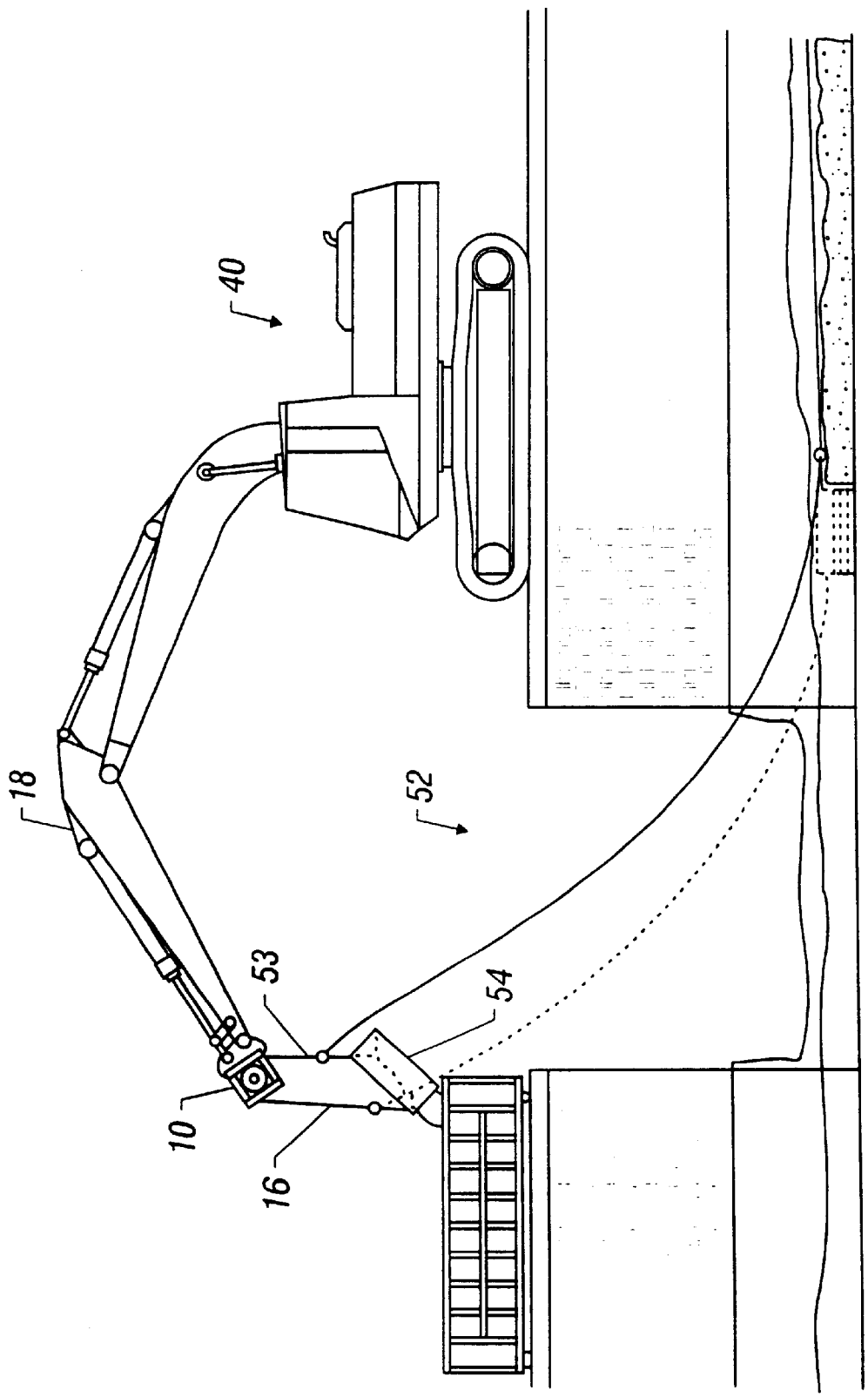
FIG. 9 is a perspective view of a pipe cleaning operation using a winch to empty the cleaning bucket.

FIG. 8 shows another embodiment of the winch 10 being used in a cleaning operation for the host pipe. The winch 10 is attached to a movable boom 18 of a conventional excavator 40a. The winch 10 is positioned below the surface of the excavated access shaft 52 to allow the cable 16 to move freely into the host pipe. The cleaning bucket 54 is pulled through the host pipe by spooling the cable 16 onto the winch 10. Further, in FIG. 9 there is a depiction of the movable boom being used in discharging debris from the cleaning bucket 54 into a collection bin. A fixed chain 53 is attached from the winch 10 at a supplemental attachment point 21 (not shown) to cleaning bucket 54. The cable 16 is spooled to hold the cleaning bucket 54 in a relatively horizontal position so that the debris does not spill out the open end. The operator positions the boom 18 with the winch 10 and the cleaning bucket 54 over a collection bin and spools out cable 16 allowing the bucket to tip and discharge the debris.

Figure 10:
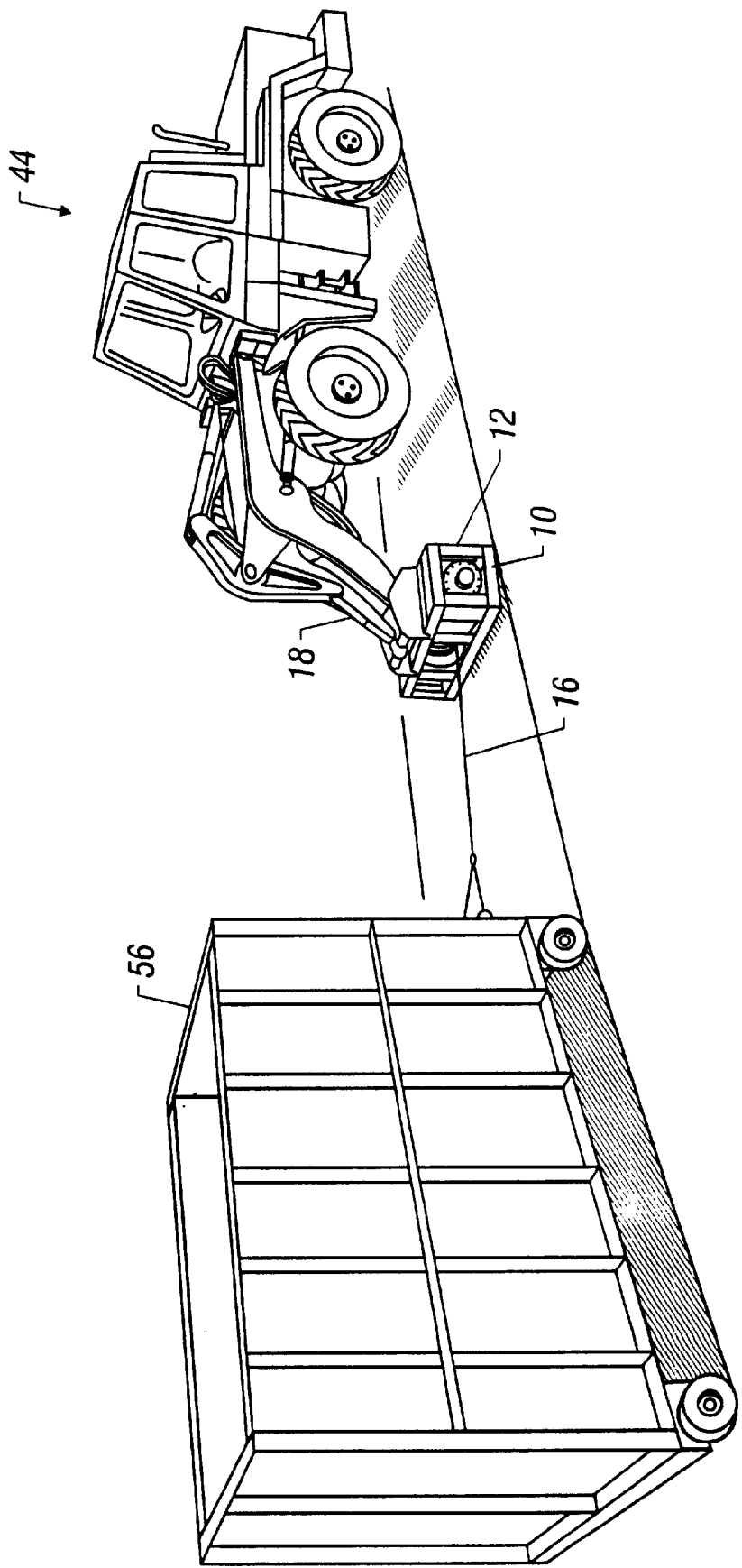
FIG. 10 is a perspective view of an operation using a winch mounted on a loader to pull a container.
Figure 11:
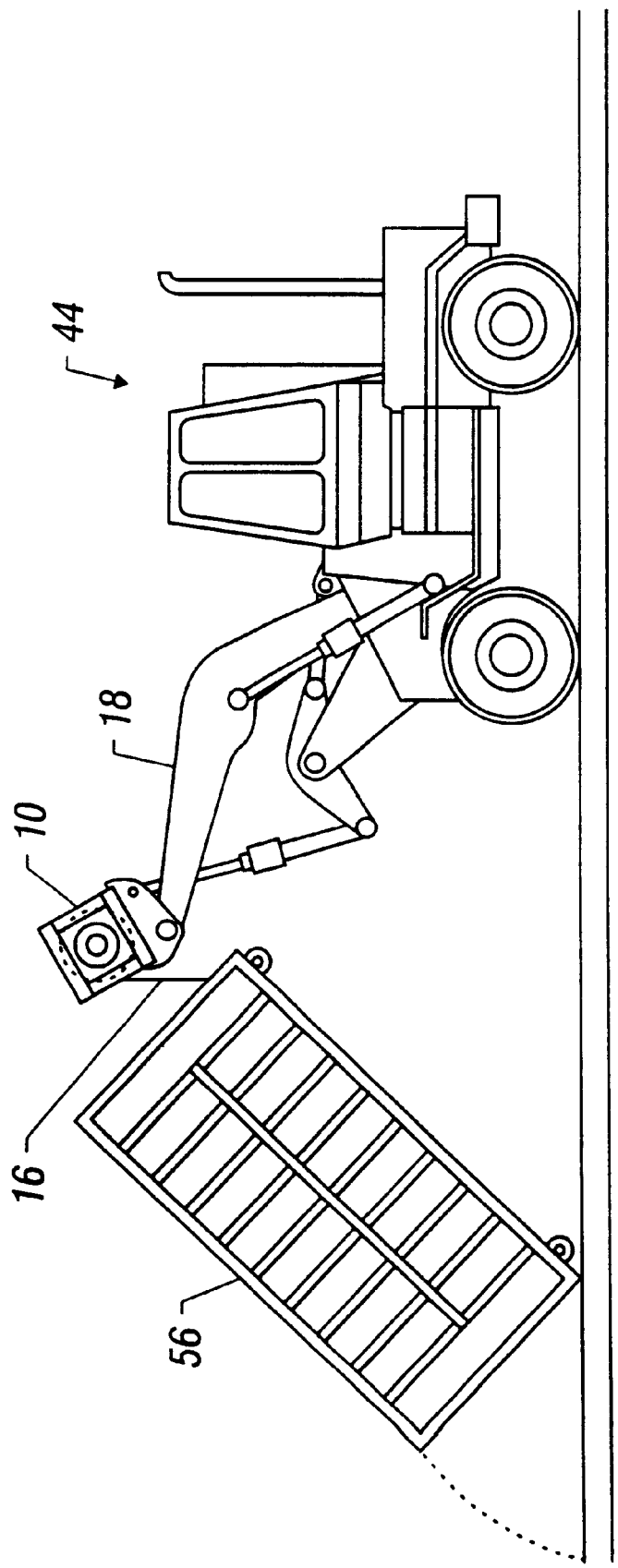
FIG. 11 is a perspective view of an operation using a winch mounted on a loader to lift a container upright.

FIG. 10 shows an alternative embodiment using the winch 10 to pull a container 56. The winch 10 is shown mounted on the boom 18 of a loader 44. The front wheels of the loader 44 are off the ground to gain an increase in the leverage to pull the container 56. The frame housing 12 is used to withstand the forced applied by the loader 44. Further, FIG. 11 shows the winch 10 with the boom 18 being elevated in order to lift the container 56 upright.

Figure 12:
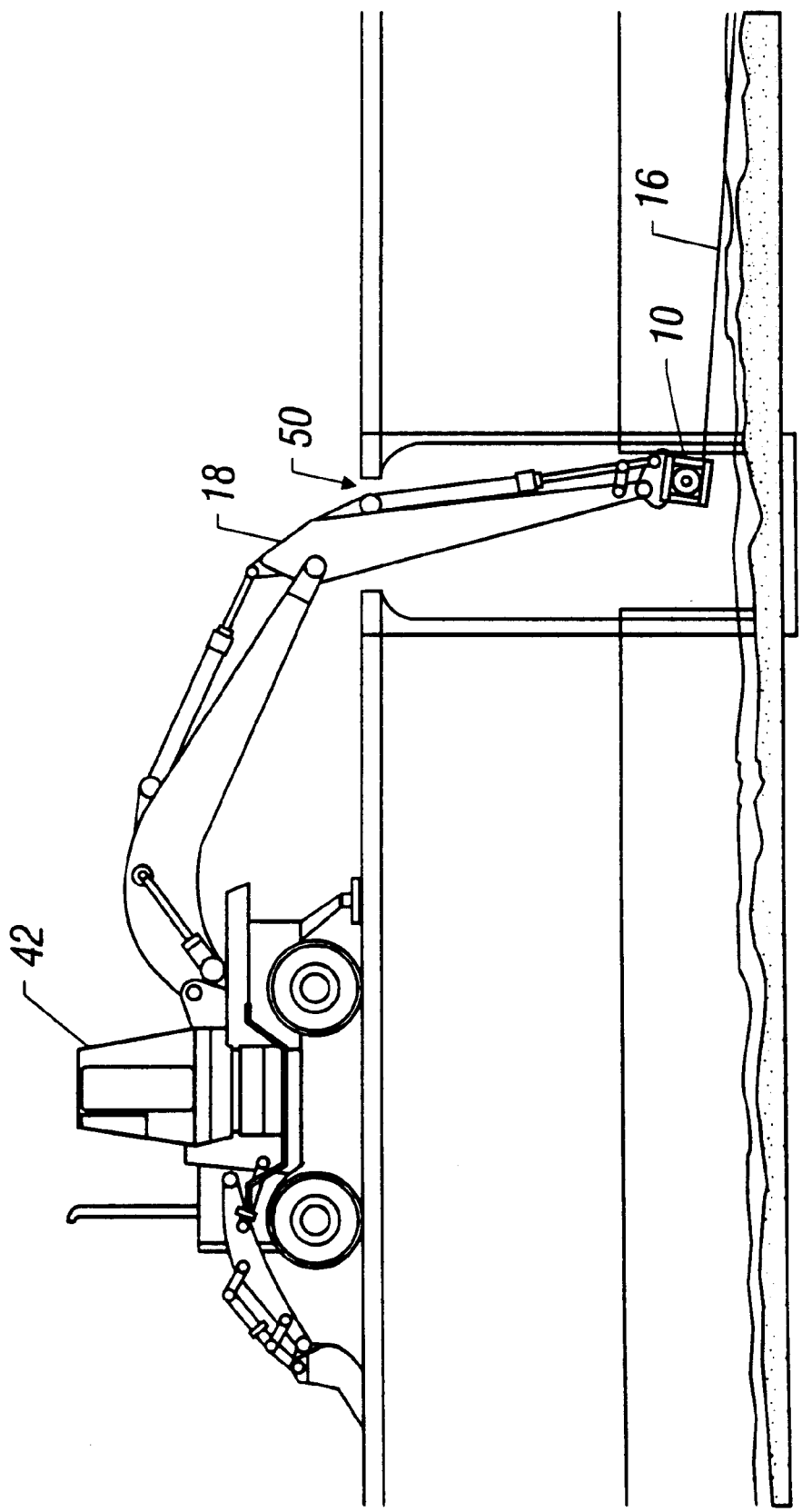
FIG. 12 is a perspective view of an operation using a winch with a backhoe as a host vehicle.
Figure 13:
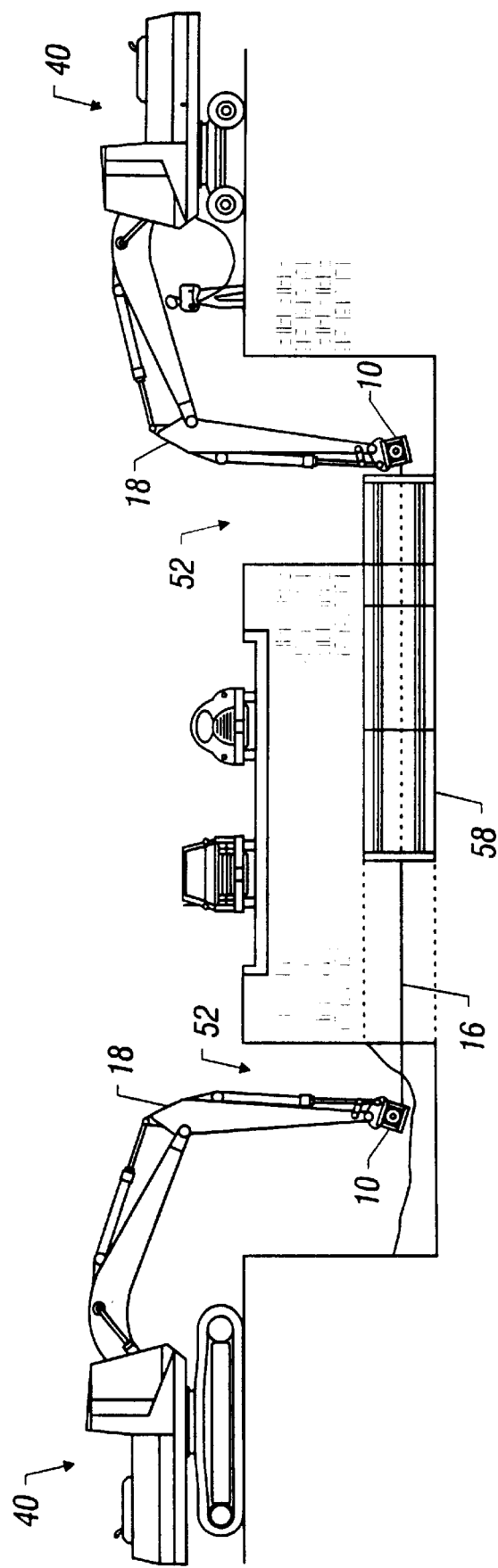
FIG. 13 is a perspective view of an operation using two winches to install a liner for the host pipe.

FIG. 12 shows an alterative embodiment with the winch 10 mounted on the boom 18 of a backhoe 42. Additionally, the boom 18 is shown inserted into an existing manhole 50 in order to show the flexibility and mobility of the apparatus. FIG. 13 shows still another embodiment with the winch 10 being used in slip lining operations to pull liner 58 segments into the host pipe.

The descriptions provided herein are not intended to cover all the embodiments and methods of the claimed invention. The winch and frame can be sized for the desired application. Other variations will be understandable to those skilled in the art.

What is claimed is:

1. A boom mountable winch comprising:
   a winch spooled with a cable;
   a housing surrounding the winch that allows free movement of the cable;
   an attachment means on said housing for engagement to a boom of a host vehicle with a custom tool attachment comprising at least two extensions from the housing provided with connection points for the custom tool connection to the boom of the host vehicle;
   spooling and unspooling means for the cable; and
   a brake mechanism to control the spooling and unspooling of the cable.

2. A boom mountable winch of claim 1 wherein the housing is a frame housing.

3. A boom mountable winch of claim 1 wherein the housing can withstand the forces applied by the weight of the host vehicle and the boom.

4. A boom mountable winch of claim 1 wherein the extensions from the housing are at least two plates mounted to the housing with openings to receive pins for attachment of the winch to the custom tool connection.

5. A boom mountable winch of claim 1 wherein the means for spooling and unspooling the winch is a hydraulic system.

6. A boom mountable winch of claim 5 wherein the hydraulic system comprises utilization of and connection to the hydraulic system of the host vehicle.

7. A boom mountable winch of claim 1 further comprising:
   a down hole boom attached to the housing; and
   a guide means in the down hole boom to position the cable in the down hole boom.

8. A boom mountable winch of claim 7 wherein the down hole boom comprises at least two beams.

9. A boom mountable winch of claim 8 wherein the beams of the down hole boom are C-beams.

10. A boom mountable winch of claim 7 wherein the down hole boom's length is adjusted by use of additional beams.

11. A boom mountable winch of claim 7 wherein the guide means is a guide roller.

12. A boom mountable winch of claim 11 wherein the guide roller's position is adjustable.

13. A boom mountable winch comprising:
    a drum spooled with cable;
    a generally rectangular frame housing in which the drum is mountable for rotatable movement allowing for movement of the cable as it is spooled off and on the drum;
    a power system for spooling and unspooling the cable;
    a custom tool connection comprising at least two plates mounted on the frame housing with openings to receive at least two attachment pins spaced to correspond to means for receiving the pins on a custom tool attachment on the boom of a host vehicle; and
    means for securing the winch with the attachment pins to the custom tool attachment of the host vehicle.

14. A boom mountable winch of claim 13 wherein said frame housing can withstand the weight of the boom and the host vehicle.

* * * * *